United States Patent [19]

Caggiano

[11] Patent Number: 5,782,225
[45] Date of Patent: Jul. 21, 1998

[54] VAPORIZATION SYSTEM

[76] Inventor: Allen Caggiano, P.O. Box 1273, Plymouth, Mass. 02362

[21] Appl. No.: 975,880

[22] Filed: Nov. 21, 1997

Related U.S. Application Data

[63] Continuation of Ser. No. 420,749, Apr. 12, 1995.
[51] Int. Cl.$^6$ .............................. F02G 5/00; F02M 23/14
[52] U.S. Cl. ........................ 123/545; 165/164; 261/44.2; 261/144; 261/152
[58] Field of Search .......................... 165/164; 123/545; 261/144, 145, 44.2, 42, 43, 152, 153, 155, 156

[56] References Cited

U.S. PATENT DOCUMENTS

| | | | |
|---|---|---|---|
| 1,178,960 | 4/1916 | Smith | 261/44.2 |
| 1,980,496 | 11/1934 | Musselwhite | 261/144 |
| 1,997,497 | 4/1935 | Poque | 261/144 |
| 3,762,385 | 10/1973 | Hollnagel | 123/122 A |
| 4,106,457 | 8/1978 | Totten et al. | 261/145 |
| 4,108,953 | 8/1978 | Rocco | 261/142 |
| 4,151,820 | 5/1979 | Furacz | 123/127 |
| 4,286,564 | 9/1981 | Van Tuyl | 123/545 |
| 4,336,783 | 6/1982 | Henson | 123/557 |
| 4,377,201 | 3/1983 | Kruse et al. | 165/76 |
| 4,469,077 | 9/1984 | Wooldridge | 123/548 |
| 4,574,764 | 3/1986 | Earle | 123/545 |
| 4,579,163 | 4/1986 | Maendel | 165/54 |
| 4,603,672 | 8/1986 | Keller | 123/554 |
| 4,637,365 | 1/1987 | Yunick | 123/545 |
| 4,700,774 | 10/1987 | Schwarz | 165/140 |
| 4,862,859 | 9/1989 | Yunick | 123/545 |
| 4,883,616 | 11/1989 | Covey, Jr. | 261/64.4 |
| 4,979,483 | 12/1990 | Ray | 123/557 |
| 5,000,253 | 3/1991 | Komarnicki | 165/54 |
| 5,040,518 | 8/1991 | Hamm | 123/557 |
| 5,101,801 | 4/1992 | Schatz | 123/556 |
| 5,140,966 | 8/1992 | Wong | 123/543 |
| 5,154,154 | 10/1992 | Henke et al. | 123/549 |
| 5,218,944 | 6/1993 | Leonard | 123/557 |
| 5,291,870 | 3/1994 | Covey, Jr. | 123/545 |
| 5,337,706 | 8/1994 | De Blasis | 123/52.3 |

FOREIGN PATENT DOCUMENTS

| | | |
|---|---|---|
| 2404630 | 2/1973 | Germany . |
| 3320167 | 12/1984 | Germany . |
| 59-158986 | 9/1984 | Japan . |
| 468076 | 4/1975 | U.S.S.R. . |

Primary Examiner—Noah P. Kamen
Attorney, Agent, or Firm—Seidel Gonda Lavorgna & Monaco, PC

[57] ABSTRACT

A fluid vaporization system comprises a first fluid inlet for receiving a first fluid, a second fluid inlet for receiving a second fluid, and a first discharge aperture for discharging the first fluid and the second fluid. A first connecting passage connects the first fluid inlet and the second fluid inlet in fluid communication with the first discharge aperture, mixes the first fluid and the second fluid to define a fluid mixture, and delivers the fluid mixture to the first discharge aperture. A third fluid inlet receives a third fluid and a second discharge aperture discharges the third fluid. A second connecting passage in heat transfer relationship with the first connecting passage connects the third fluid inlet in fluid communication with the second discharge aperture and delivers the third fluid from the third fluid inlet to the second discharge aperture to effect heat transfer from the third fluid to the fluid mixture such that the fluid mixture is discharged by the first discharge aperture in a vaporized state.

15 Claims, 8 Drawing Sheets

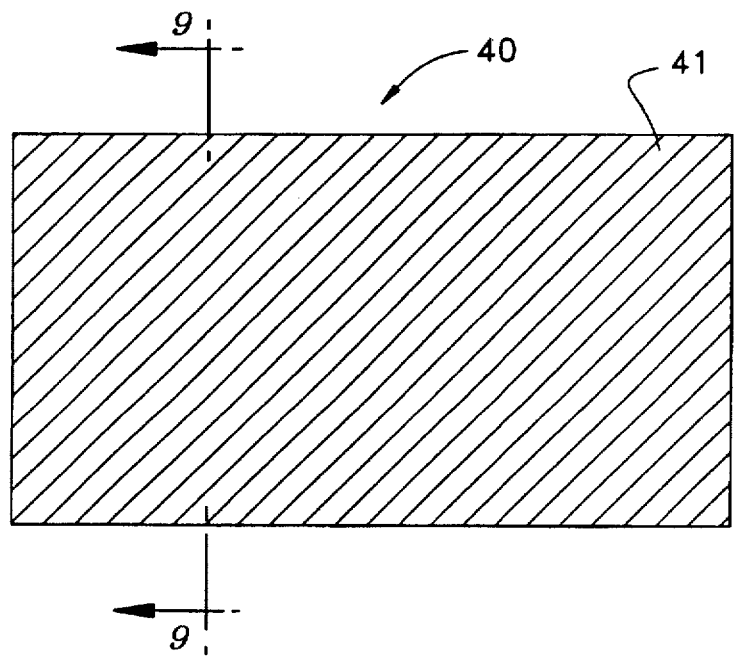
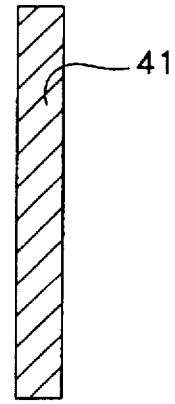
FIG. 8  FIG. 9
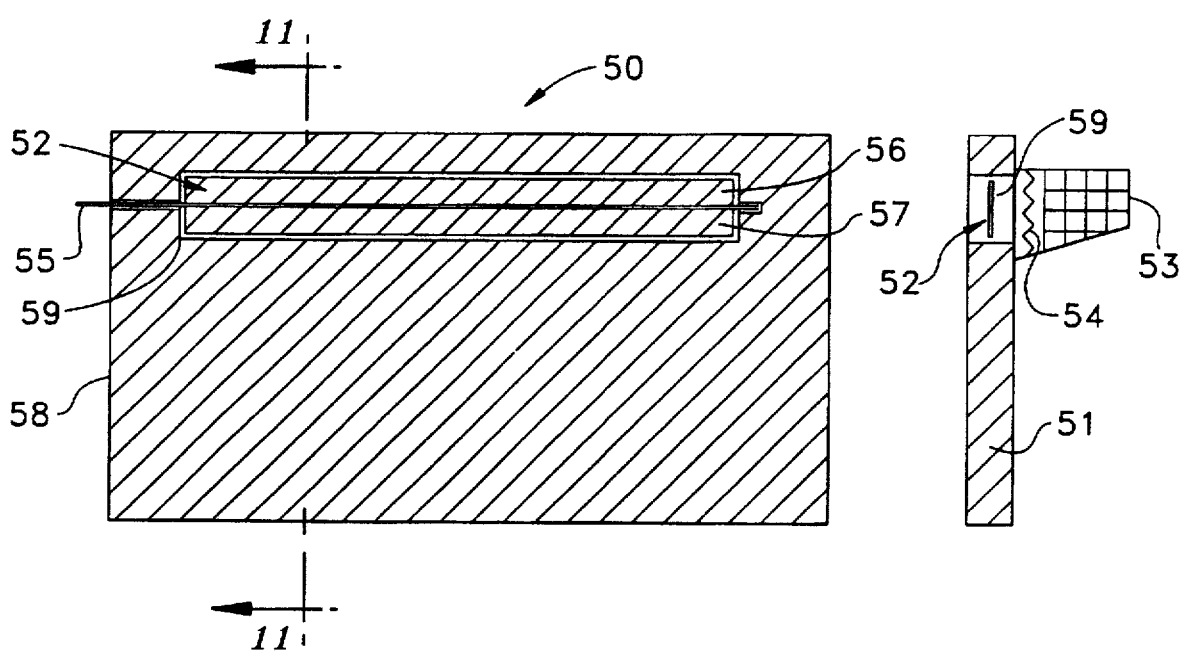
FIG. 10  FIG. 11

VAPORIZATION SYSTEM

This is a continuation of co-pending application Ser. No. 08/420,749 filed on Apr. 12, 1995.

BACKGROUND OF THE INVENTION

1. Field of the Invention

The invention relates generally to a fluid vaporization system and, more particularly, to a fluid vaporization system which heats a mixture of fluids and delivers the mixture in a vaporized state. The fluid vaporization system is particularly well adapted for heating a mixture of air and liquid fuel and delivering it to an internal combustion engine as a vapor.

2. Background of the Invention

In an effort to reduce pollution and conserve resources, continual efforts are being made to improve the performance of internal combustion engines, particularly in automobiles and other motor vehicles. Motor vehicle engines must operate as efficiently as possible while simultaneously minimizing emissions and providing sufficient power. Toward these goals, it has been sought to provide the most efficient and complete combustion of the fuel/air mixture consumed by the engine. In order to improve combustion of the fuel/air mixture, one approach has been to heat the fuel/air mixture to a vapor state before the fuel enters the engine. However, this and other attempts to achieve improved engine performance and reduced emissions by vaporizing the fuel/air mixture have suffered from a number of shortcomings.

Some attempts have suffered from an inability to sufficiently control the amount of vaporized fuel produced under all engine load conditions, especially under full load conditions. Other attempts have suffered from premature detonation of the vaporized fuel prior to reaching the engine and excessive accumulation of vaporized fuel outside of the engine causing safety concerns. Yet other attempts have suffered from the inability to produce sufficient vaporized fuel under engine loads greater than an idle condition.

Accordingly, an improved fluid vaporization system is desired that provides a more optimal and effective fuel/air mixture to an engine and is capable of supplying a fuel/air mixture in a vaporized state such that fuel efficiency is increased while emissions and safety concerns are decreased.

SUMMARY OF THE INVENTION

It is an object of the present invention to provide a highly efficient fluid vaporization system which employs a dual cross-counterflow heat exchanger to provide a fuel/air vapor mixture to an internal combustion engine to increase the fuel efficiency and decrease emissions.

It is another object of the present invention to provide a fluid vaporization system for an internal combustion engine in which air flow, fuel flow, and coolant or exhaust gas flow are all independently controllable such that a fuel/air mixture flowing through the system is fully vaporized under all engine load conditions.

It is yet another object of the present invention to provide a fluid vaporization system comprising a vaporizing unit which is easily fabricated, assembled and disassembled to reduce manufacturing costs and facilitate field repairs.

It is a further object of the invention to provide a fluid vaporization system which can precisely control the amount of fuel/air mixture introduced into the vaporizing unit to adequately power an engine under any load condition.

It is a further object of the present invention to provide a fluid vaporization system which can precisely control the flow of a fuel/air mixture within the system and allow for expansion of the heated fuel/air mixture therein.

It is a further object of the present invention to provide a fluid vaporization system which can be utilized in both carbureted and fuel injected engines.

It is yet a further object of the present invention to provide a fluid vaporization system with numerous safety features that eliminate the risks of predetonation and excessive fuel vapor accumulation.

The foregoing and other objects of the present invention are carried out by a fluid vaporization system including a first fluid inlet for receiving a first fluid, a second fluid inlet for receiving a second fluid, and a first discharge aperture for discharging the first and second fluids. A first connecting passage connects the first fluid inlet and the second fluid inlet in fluid communication with the first discharge aperture, mixes the first fluid and the second fluid to form a fluid mixture, and delivers the fluid mixture to the first discharge aperture. A third fluid inlet receives a third fluid and a second discharge aperture discharges the third fluid. A second connecting passage in heat transfer relationship with the first connecting passage connects the third fluid inlet in fluid communication with the second discharge aperture and delivers the third fluid from the third fluid inlet to the second discharge aperture to effect heat transfer from the third fluid to the fluid mixture such that the fluid mixture is discharged by the first discharge aperture in a vaporized state.

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 8 is a cross sectional view of the right side outer plate assembly, taken along line VIII—VIII of FIG. 1;

FIG. 9 is a cross sectional view of the right side outer plate assembly, taken along line IX—IX of FIG. 8;

FIG. 10 is a cross sectional view of the left side outer plate assembly, taken along line X—X of FIG. 1;

FIG. 11 is a cross sectional view of the left side outer plate assembly, taken along line XI—XI of FIG. 10;

DETAILED DESCRIPTION OF THE PREFERRED EMBODIMENT

Figure 1:
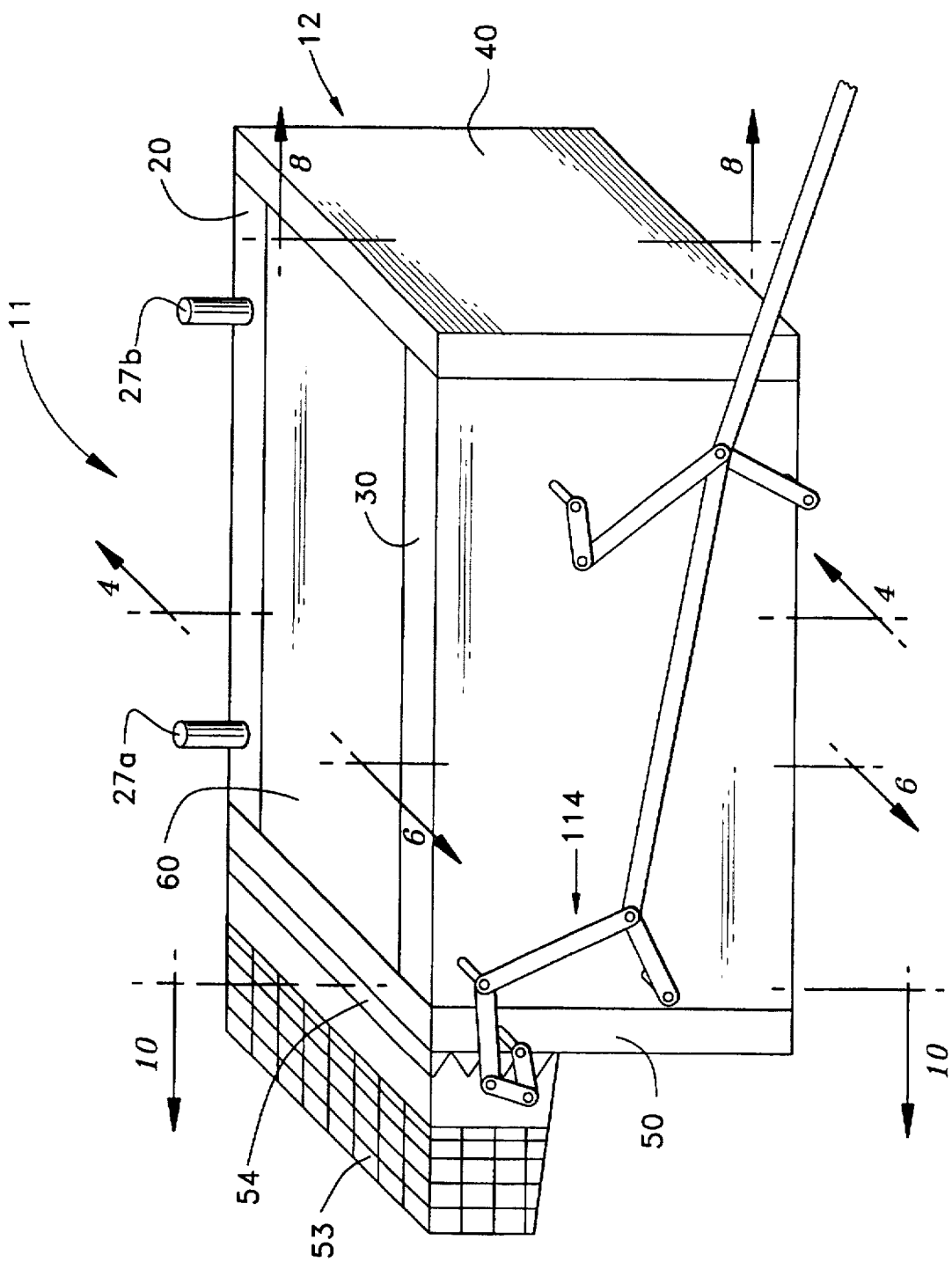
FIG. 1 is a perspective view of a vaporizing unit employed in a fluid vaporization system according to an embodiment of the present invention.

The preferred embodiment of the vaporizing system according to the present invention is described below with a specific application to an internal combustion engine, where the mixture of fluids is, for example, a mixture of air and liquid fuel which is heated and delivered by the fluid vaporization system to the internal combustion engine in a vaporized state. However, it will be understood by those of ordinary skill in the art that the present invention is also suitable for other applications requiring the input of fluids in a vaporized state, such as, for example, heating oil fuel processors, air conditioning systems, refrigeration systems and ice storage tanks. It will further be understood that the fluids could be one or more types of liquids or a combination of one or more types of liquids and gases.

Certain terminology is used in the following description for convenience only and is not intended to be limiting. The words right, left, rear, front, upper, lower, inner and outer designate directions in the drawing to which reference is made. Such terminology includes the words above specifically mentioned and words of similar import.

Figure 3A:
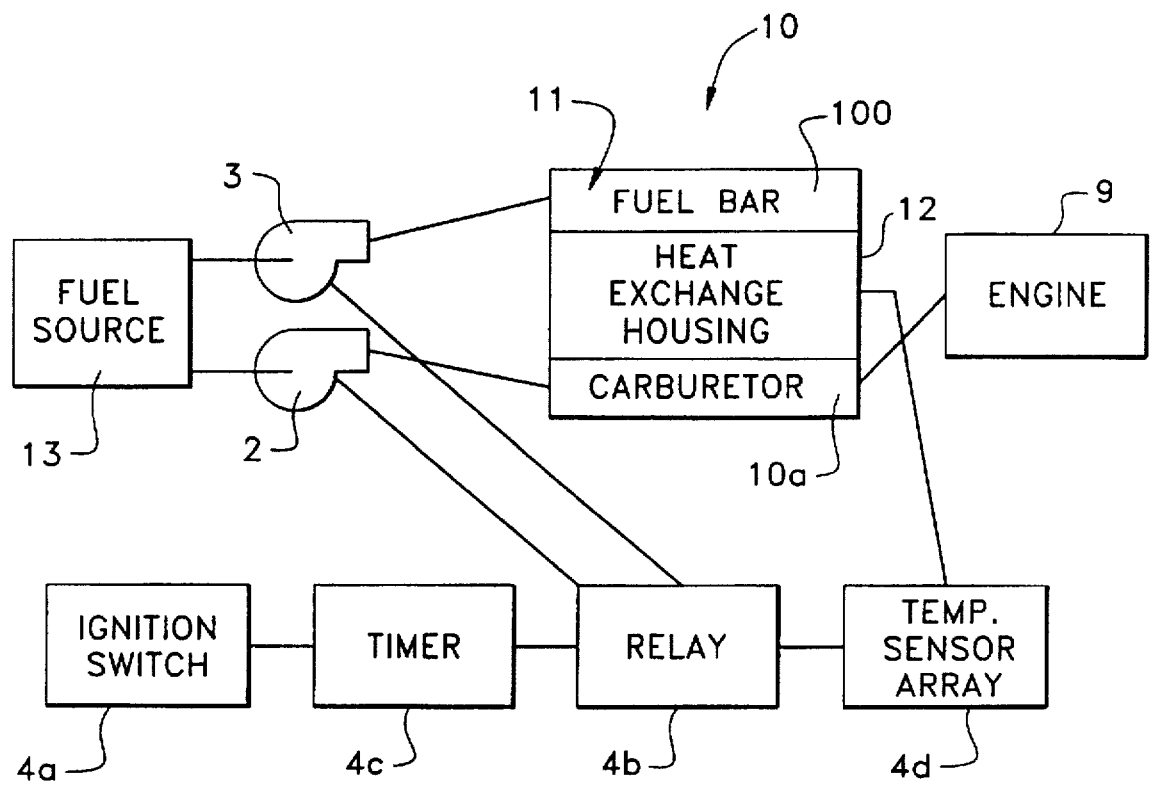
FIG. 3a is a block diagram showing the fuel circuit of the vaporizing system according to the present invention.
Figure 3B:
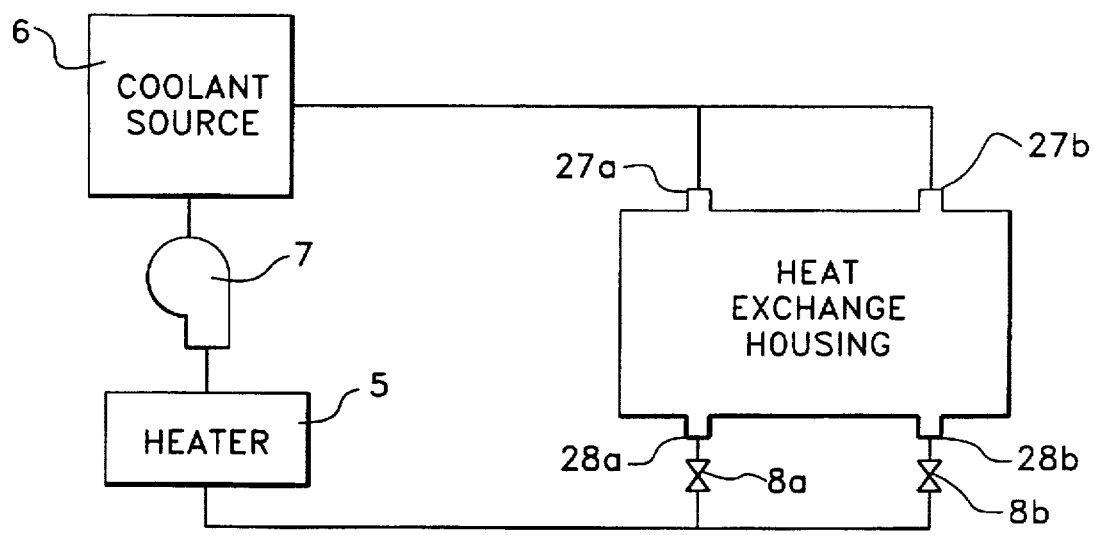
FIG. 3b is a block diagram showing the hydraulic coolant circuit of the fluid vaporization system according to the present invention.

Referring now to the drawings in detail, wherein like reference numerals are used to designate identical or corresponding parts throughout the several views, FIGS. 3a and 3b show a fluid vaporization system, generally designated 10, according to an embodiment of the present invention. The fluid vaporization system 10 is applied in connection with an internal combustion engine and comprises a vaporizing unit 11 connected to the carburetor 10a of an engine 9. In the present embodiment, the mixture of fluids comprises, for example, a mixture of a liquid fuel, such as hydrocarbon fuel, and air.

Figure 2:
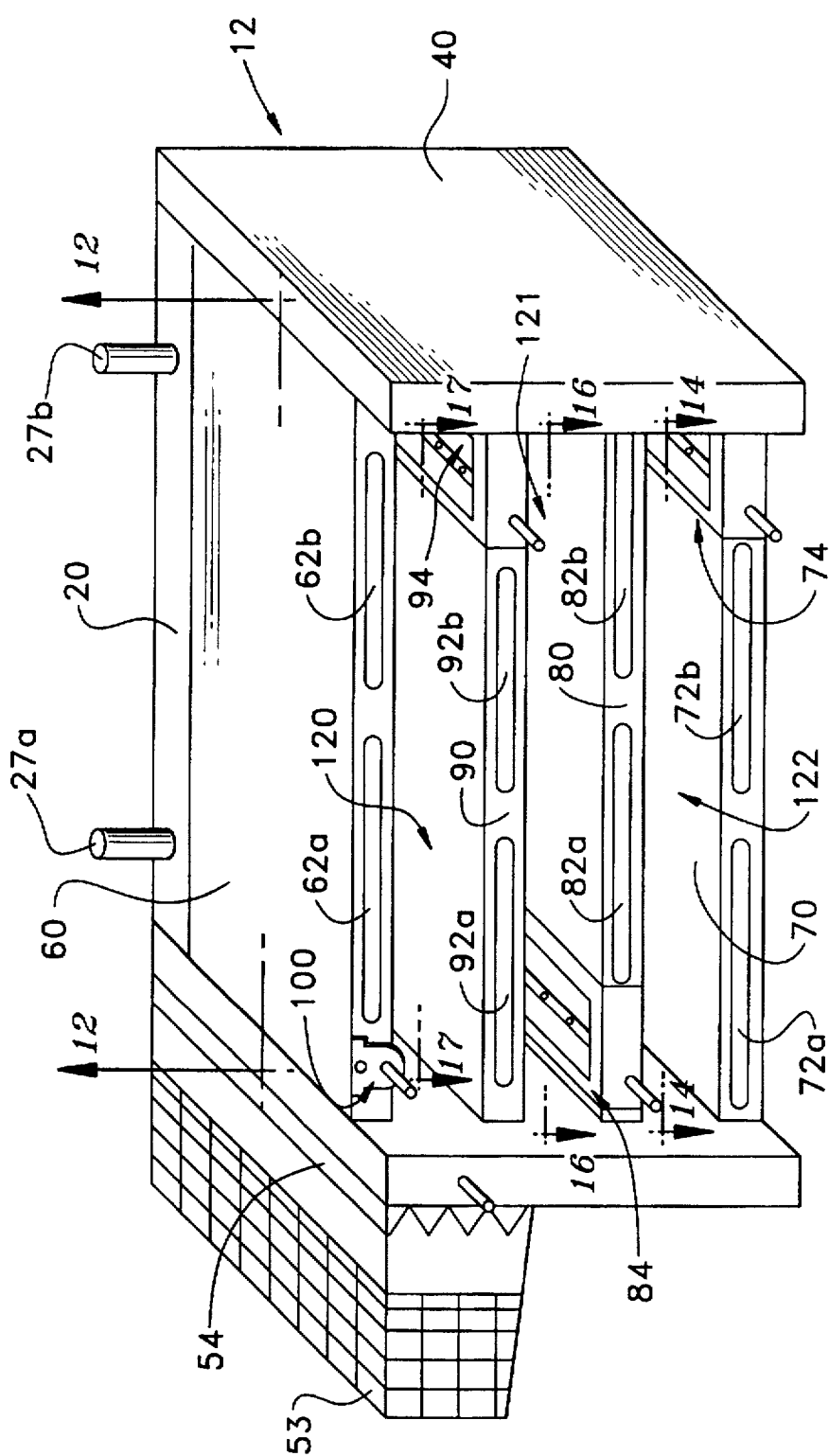
FIG. 2 is a perspective view of the vaporizing unit of FIG. 1 with the front outer plate assembly removed.

As shown in FIGS. 1 and 2, the vaporizing unit 11 comprises a heat exchange housing 12 and a fuel bar assembly 100 for controlling the amount of fuel entering the vaporizing unit 11 as further described below. The heat exchange housing 12 is preferably formed of plated, die cast, or extruded aluminum, and is sufficiently sealed such that the air and fuel being mixed and vaporized within the housing do not escape therefrom. It is understood that the fluid vaporization system of the present invention could be manufactured from other materials such as iron, copper, stainless steel, or highly thermally conductive polymers depending on the application. The heat exchange housing 12 includes a rear outer plate assembly 20, a front outer plate assembly 30, a right side outer plate assembly 40, a left side outer plate assembly 50, an upper outer plate assembly 60, a lower outer plate assembly 70, a lower inner plate assembly 80, and an upper inner plate assembly 90. The plate assemblies 60 and 70 comprise upper and lower plates 61 and 71, respectively, and the plate assemblies 20, 30, 40 and 50 comprise side plates 21, 31, 41 and 51, respectively, connecting the upper plate 61 and the lower plate 71 in spaced relation so as to define an airtight sealed chamber. The plate assemblies 80 and 90 comprise intermediate plates 81 and 91 disposed within the sealed chamber and connected to the side plates 40 and 50. As shown in FIG. 1, the vaporizing unit 11 is linked to a conventional progressive linkage 114 which controls the operation of the fuel bar assembly 100 as further described below.

Figures 4, 5:
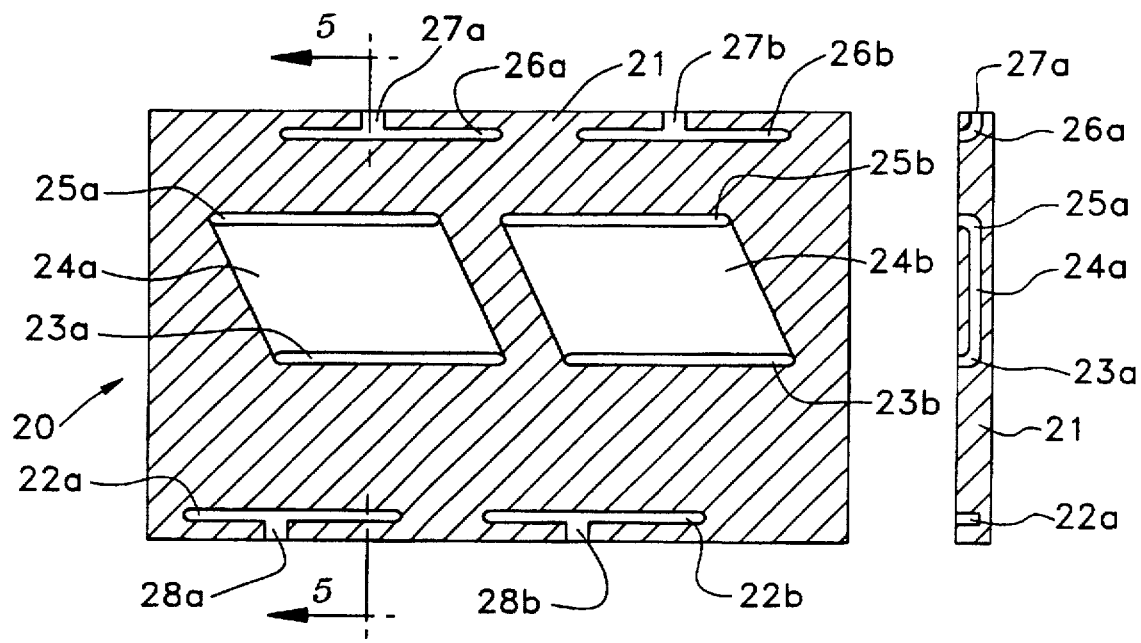
FIG. 4 is a cross sectional view of the back outer plate assembly, taken along line IV—IV of FIG. 1.
FIG. 5 is a cross sectional view of the back outer plate assembly, taken along line V—V of FIG. 4.

As best shown in FIGS. 4 and 5, the side plate or rear outer plate 21 of the rear outer plate assembly 20 includes a left inlet 28a, a right inlet 28b, a left discharge outlet 27a, and a right discharge outlet 27b. The left and right inlets 28a and 28b open out from the bottom wall of the plate 21, and the left and right outlets 27a and 27b open out from the top wall of the plate 21. The left inlet 28a connects to a left lower channel 22a, and the right inlet 28b connects to a right lower channel 22b. The left lower channel 22a and the right lower channel 22b have openings in the inner wall of the plate 21. The left discharge outlet 27a connects to the left upper channel 26a and the right discharge outlet 27b connects to a right upper channel 26b. Left upper channel 26a and right upper channel 26b have openings in the inner wall of plate 21. The plate 21 also includes a left medial cavity 24a and a right medial cavity 24b disposed at an intermediate portion of the plate 21. The left medial cavity 24a connects with a left upper medial channel 25a and a left lower medial channel 23a. The right medial cavity 24b connects with a right upper medial channel 25b and a right lower medial channel 23b. Medial channels 23a, 23b, 25a and 25b all open out from the inner wall of the plate 21.

Figures 6, 7:
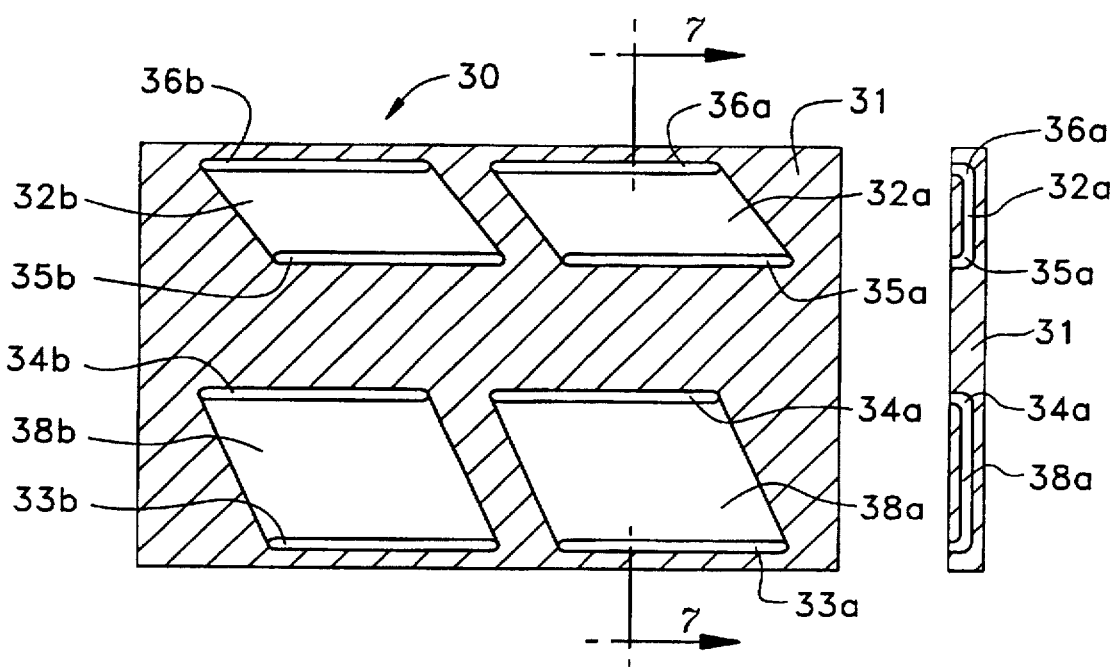
FIG. 6 is a cross sectional view of the front outer plate assembly, taken along line VI—VI of FIG. 1.
FIG. 7 is a cross sectional view of the front outer plate assembly, taken along line VII—VII of FIG. 6.

As shown in FIGS. 6 and 7, the side plate or front outer plate 31 of the front outer plate assembly 30 includes a left lower cavity 38a, a left upper cavity 32a, a right lower cavity 38b, and a right upper cavity 32b. The left lower cavity 38a connects with a left lower cavity lower channel 33a and a left lower cavity upper channel 34a. The right lower cavity 38b connects with a right lower cavity lower channel 33b and a right lower cavity upper channel 34b. The left upper cavity 32a connects with a left upper cavity lower channel 35a and a left upper cavity upper channel 36a. The right upper cavity 32b connects with a right upper cavity lower channel 35b and a right upper cavity upper channel 36b. Channels 33a, 33b, 34a, 34b, 35a, 35b, 36a, and 36b all open out from the inner wall of the plate 31.

FIGS. 8 and 9 show cross sectional views of the right side plate assembly 40. In the present embodiment, the right side plate assembly 40 is a solid side plate 41.

Referring now to FIGS. 10 and 11, the left side outer plate assembly 50 includes a left side plate 51 and an inlet channel 59 extending therethrough. An air damper assembly 52 is rotatably disposed within the inlet channel 59 for controlling the volume of air that enters through inlet channel 59. The damper assembly 52 includes a central rod 55 and radially extending vanes 56 and 57. The central rod 55 extends past a frontal edge 58 of the plate 51 for attachment to the progressive linkage 114 shown in FIG. 1. Rotation of the damper assembly 52 is controlled by the progressive linkage 114 to regulate the amount of air drawn through the heat exchange housing 12. Preferably, an air filter 53 is attached to the inlet channel 59 for removing contaminants from the incoming air. The air filter 53 can also contain an air heating coil 54 for raising the temperature of the air entering the air filter.

Figures 12, 13:
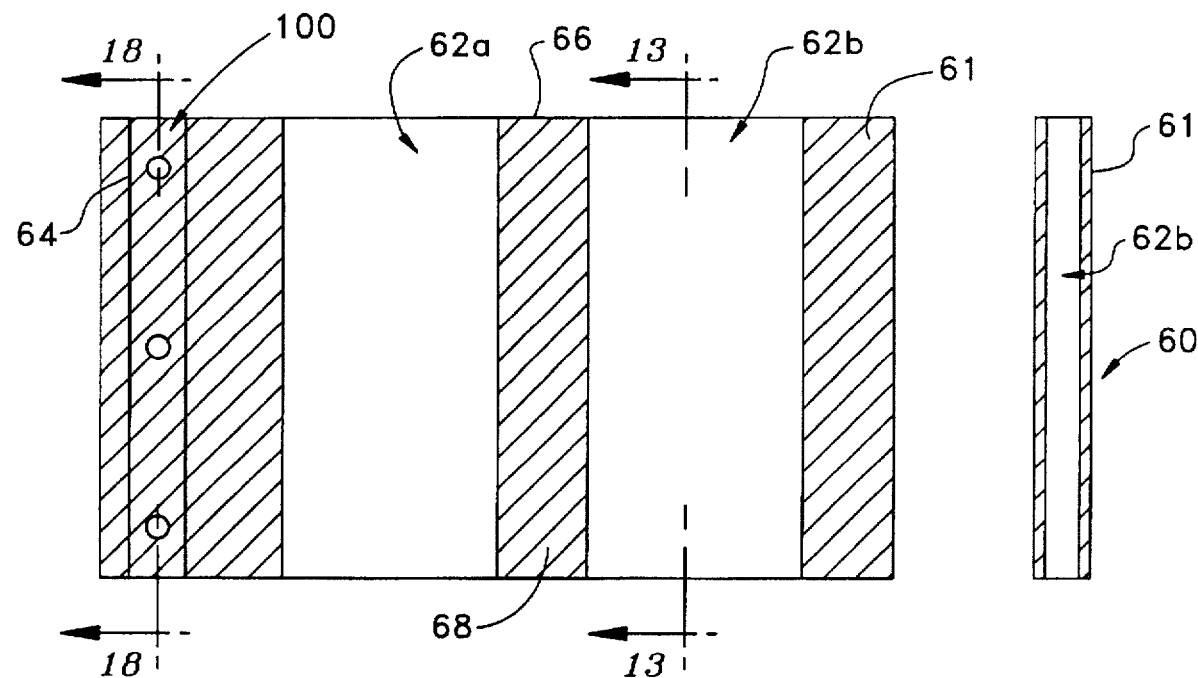
FIG. 12 is a cross sectional view of the upper outer plate assembly, taken along line XII—XII of FIG. 2.
FIG. 13 is a cross sectional view of the upper outer plate assembly, taken along line XIII—XIII of FIG. 12.

Referring now to FIGS. 12 and 13, the upper plate 61 of the upper outer plate assembly 60 is provided with a left side channel 62a, a right side channel 62b and fluid inlet or bore 64. The left side channel 62a, the right side channel 62b and the bore 64 extend through the entire height of the plate 61 from an upper end 66 to a lower end 68 of the plate 61. A fluid bar assembly 100 is disposed within the bore 64 as further described below.

Figures 14, 15:
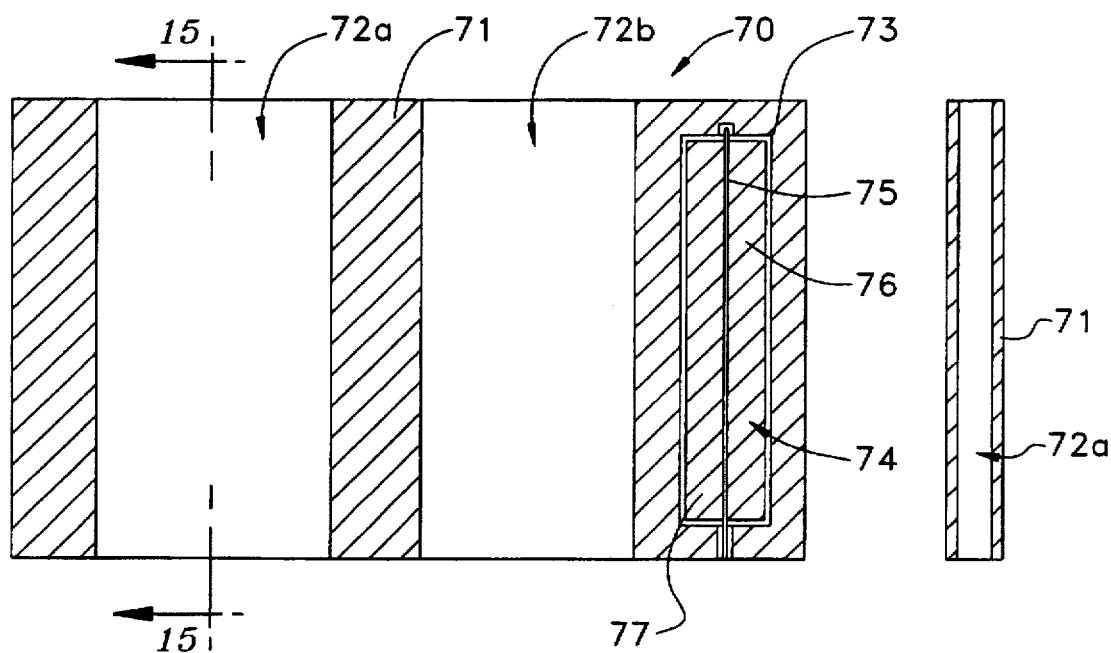
FIG. 14 is a cross sectional view of the lower outer plate assembly, taken along line XIV—XIV of FIG. 2.
FIG. 15 is a cross sectional view of the lower outer plate assembly, taken along line XV—XV of FIG. 14.

As shown in FIGS. 14 and 15, the lower plate 71 of the lower outer plate assembly 70 is provided with a left side channel 72a extending through the entire height of the plate 71 and a right side channel 72b extending through the entire height of the plate 71. The plate 71 further includes a discharge opening 73 within which is disposed a damper assembly 74. The damper assembly 74 comprises a central rod 75 and radially extending vanes 76 and 77. The damper assembly 74 is rotatably mounted within the discharge opening 73, and the central rod 75 extends past a frontal edge of plate 71 for attachment to the progressive linkage 114 as described above for the damper assembly 52. It is also desirable to provide a drain (not shown) on both the right and left sides of the plate 71 to allow for draining of any fluids that collect therein.

Figure 16:
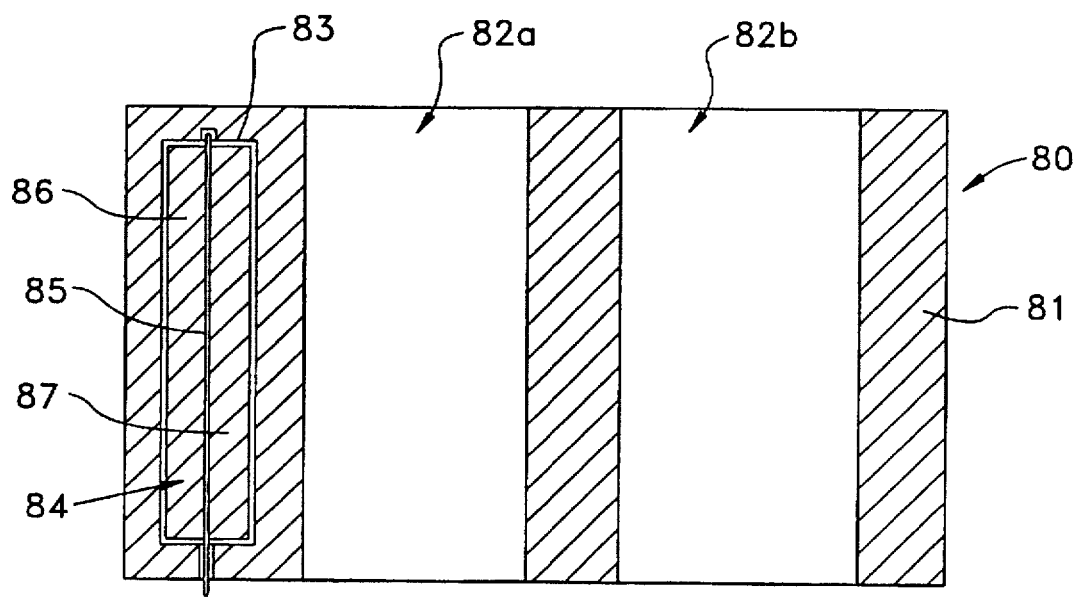
FIG. 16 is a cross sectional view of the lower inner plate assembly, taken along line XVI—XVI of FIG. 2.

Referring now to FIG. 16, the intermediate plate 81 of the lower inner plate assembly 80 includes a left side channel 82a extending through the entire height of the plate 81 and a right side channel 82b that also extends through the entire height of the plate 81. The plate 81 further includes a discharge opening 83 within which is disposed a damper assembly 84. The damper assembly 84 comprises a central rod 85 and radially extending vanes 86 and 87. The damper assembly 84 is rotatably mounted within the discharge opening 83, and the central rod 85 extends past a frontal edge of plate 81 for attachment to the progressive linkage 114 as described above for the damper assembly 52.

Figure 17:
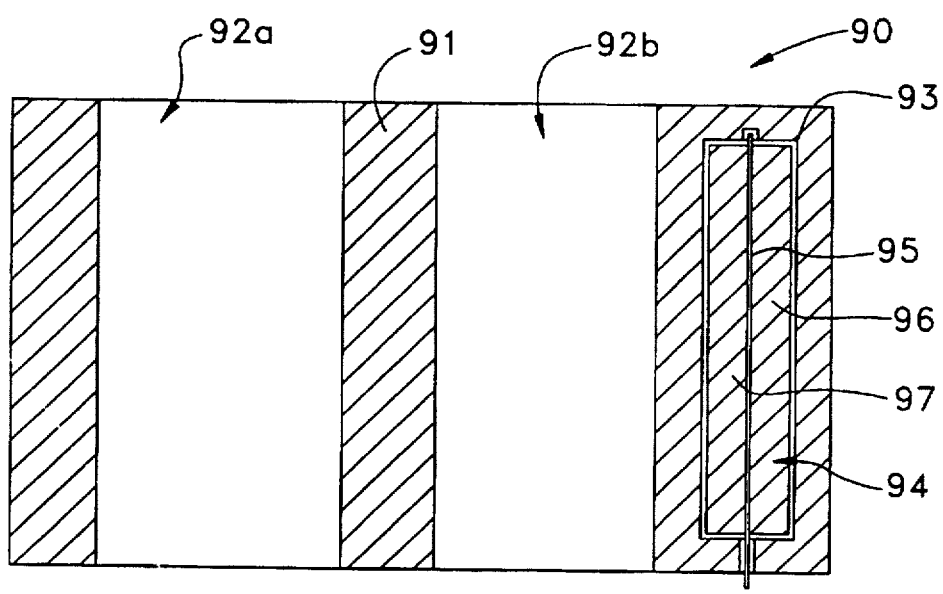
FIG. 17 is a cross sectional view of the upper inner plate assembly, taken along line XVII—XVII of FIG. 2.

As shown in FIG. 17, the intermediate plate 91 of the upper inner plate assembly 90 includes a left side channel 92a extending through the entire height of the plate 91 and a right side channel 92b also extending through the entire height of the plate 91. The plate 91 further includes a discharge opening 93 within which is disposed a damper assembly 94. The damper assembly 94 comprises a central rod 95 and radially extending vanes 96 and 97. The damper assembly 94 is rotatably mounted within the discharge opening 93 and the central rod 95 extends past a frontal edge of the plate 91 for attachment to the progressive linkage 114 as described above for the damper assembly 52.

When assembled, as shown in FIGS. 1 and 2, the plate assemblies 20, 30, 40, 50, 60, 70, 80 and 90 constitute the heat exchange housing 12 of the vaporizing unit 11 and provide three passageways therein: an upper passageway 120, a medial passageway 121, and a lower passageway 122. The upper passageway 120 is defined by the lower side of the upper outer plate assembly 60 and the upper side of the upper inner plate assembly 90. The medial passageway 121 is defined by the lower side of the upper inner plate assembly 90 and the upper side of the lower inner plate assembly 80. The lower passageway 122 is defined by the lower side of the lower inner plate assembly 80 and the upper side of the lower outer plate assembly 70. The upper passageway 120, the medial passageway 121, and the lower passageway 122 define a "first" continuous connecting passage having a serpentine shape which connects the fluid inlet or bore 64 of the upper plate 61 and the inlet channel 59 of the left side plate 51 in fluid communication with the discharge opening 73 of the lower plate 71. Preferably, the height of each passageway varies to accommodate expansion of the fluid traveling therein as a result of heating. For example, when the vaporizing unit 11 is employed in combination with a hydrocarbon fuel-burning internal combustion engine, it has been found that the optimal height for each passageway is as follows:

If the height of the upper passageway 120 equals x, then the height of the medial passageway 121 equals 1.25x, and the height of the lower passageway 122 equals 1.5x.

Figure 18:
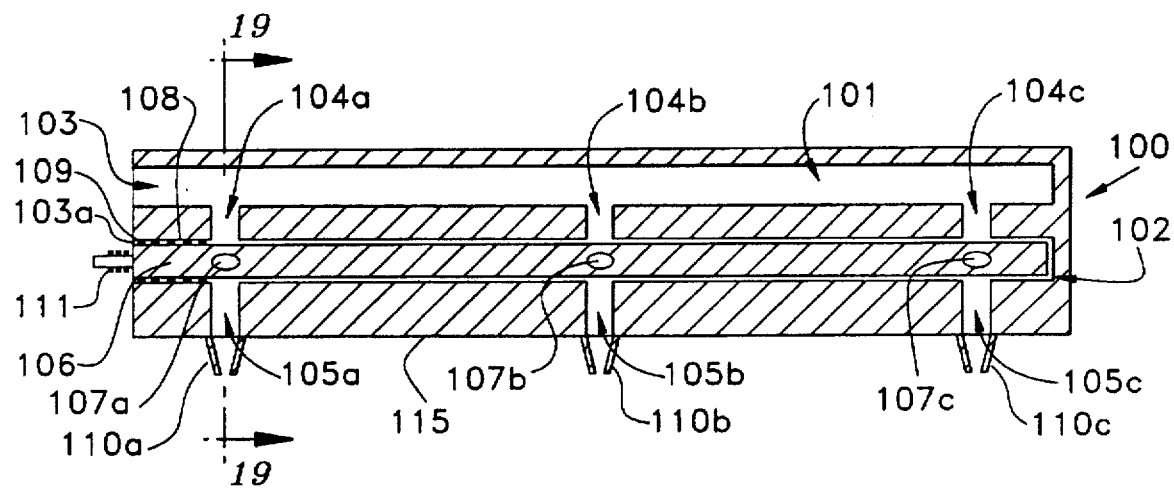
FIG. 18 is a cross sectional view of the fuel bar assembly, taken along line XVIII—XVIII of FIG. 12.
Figure 19:
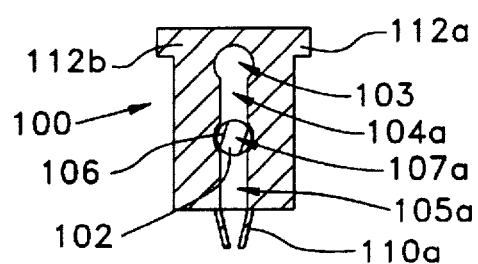
FIG. 19 is a cross sectional view of the fuel bar assembly, taken along line XIX—XIX of FIG. 18.

Referring now to FIGS. 12, 18 and 19, a fluid bar assembly 100 is disposed within the bore 64 of the upper outer plate assembly 60. The fuel bar assembly 100 comprises an upper blind bore 101 and a lower blind bore 102. The upper blind bore 101 opens at an inlet end 103 thereof and the lower blind bore opens at an inlet end 103a thereof, both located at a left end of the fluid bar assembly 100. Upper ports 104a, 104b, and 104c connect the upper blind bore 101 in fluid communication with the lower blind bore 102. Lower ports 105a, 105b, and 105c connect the lower blind bore 102 to a lower surface 115 of the fluid bar assembly 100. A rod 106 is disposed within the lower blind bore 102 and is mounted for rotational movement therein. The rod 106 has bores 107a, 107b, and 107c extending therethrough in spaced relation to establish fluid communication between the ports 104a, 104b, 104c and the ports 105a, 105b, 105c, respectively, upon rotation of the rod 106. Disposed on the outer circumference of the rod 106 are O-ring gaskets 108 and seals 109 to prevent leakage of fluid from the outlet end of bore 102. A return spring 111 is provided for returning the rod 106 to a normally closed position wherein the rod 106 blocks passage of fluids to the ports 105a–105c. Disposed at outlet ends of the ports 105a, 105b and 105c are nozzles 110a, 110b, and 110c, respectively.

Preferably, as shown in FIG. 19, the fluid bar assembly 100 is provided with protrusions 112a and 112b formed along the top edge of the fluid bar assembly 100. Mating grooves (not shown) cut in the plate 61 matingly receive the protrusions 112a and 112b of the fluid bar assembly 100 and facilitate the removal of the fluid bar assembly 100 from the plate 61. It is also understood that the fluid bar assembly 100 can be formed integrally with the plate 61, with the rod 106 permitted to rotate freely relative to the plate 61.

The operation of the fluid vaporization system 10 according to the present invention will be described with an internal combustion engine with reference to FIGS. 3a and 3b. In such an application, the mixture of fluids to be delivered to the internal combustion engine in a vaporized state comprises a mixture of liquid fuel and air, and the fluid bar assembly 100 comprises a fuel bar assembly.

As shown schematically in FIG. 3a, the vaporizing unit 11 of the present invention is attached to the bottom part of a conventional carburetor 10a. The top part of the conventional carburetor, including the casing that contains the choke assembly, is removed prior to attachment of the vaporizing unit 11. In this arrangement, the air damper assembly 74 disposed in the lower outer plate assembly 70 functions as the carburetor choke assembly.

As shown in FIG. 3b, high temperature coolant from a coolant source 6, preferably engine coolant, is pumped via a pump 7 to a coil heater 5. The heater 5 heats the engine coolant to approximately 180° F. when and if required. Upon exiting the coil heater 5, the high-temperature coolant travels to inlet valves 8a and 8b such as, for example, conventional mechanical or electronic ball valves, which control the amount of coolant passing therethrough into the left and right inlets 28a and 28b, respectively, of the vaporizing unit 11. Upon entering the vaporizing unit 11, the high-temperature coolant travels in two adjacent paths defined by the various plate assemblies 20, 30, 40, 50, 60, 70, 80 and 90 as described below.

The first path is serially defined by the left inlet 28a and the left lower channel 22a of the rear outer plate 20; the left side channel 72a of the lower outer plate 70; the left lower cavity lower channel 33a, the left lower cavity 38a, and the left lower cavity upper channel 34a of the front outer plate assembly 30; the left side channel 82a of the lower inner plate assembly 80; the left lower medial channel 23a, the left medial cavity 24a, the left upper medial channel 25a of the rear outer plate assembly 20; the left side channel 92a of the upper inner plate assembly 90; the left upper cavity lower channel 35a, the left upper cavity 32a, and the left upper cavity upper channel 36a of the front outer plate assembly 30; the left side channel 62a of the upper outer plate assembly 60; and the left upper channel 26a and the left outlet 27a of the rear outer plate assembly 20. It is apparent from the above description that the first path defines a "second" continuous connecting passage having a serpentine shape for connecting the left inlet 28a in fluid communication with the left outlet 27b.

The second path is serially defined by the right inlet 28b and the left lower channel 22b of the rear outer plate 20; the left side channel 72b of the lower outer plate 70; the left lower cavity lower channel 33b, the left lower cavity 38b, and the left lower cavity upper channel 34b of the front outer plate assembly 30; the left side channel 82b of the lower inner plate assembly 80; the left lower medial channel 23b, the left medial cavity 24b, the left upper medial channel 25b of the rear outer plate assembly 20; the left side channel 92b of the upper inner plate assembly 90; the left upper cavity lower channel 35b, the left upper cavity 32b, and the left upper cavity upper channel 36b of the front outer plate assembly 30; the left side channel 62b of the upper outer plate assembly 60; and the left upper channel 26b and the right outlet 27b of the rear outer plate assembly 20. It is apparent from the above description that the second path defines a "third" continuous connecting passage having a serpentine shape for connecting the right inlet 28b in fluid communication with the right outlet 27b.

The inlet valves 8a and 8b are regulated, for example, by two independent thermostats (not shown) which are submerged in the coolant paths on the lower outer plate assembly 70. The foregoing construction facilitates maintaining, under all load conditions, a constant temperature across the first and second coolant paths and the upper, medial and lower passageways, thus preventing a drop in temperature which will cause the vapor fuel to undergo condensation and greatly decrease the fuel efficiency and increase exhaust pollutants. Coolant exiting from the outlets 27a and 27b is then returned to the engine coolant source 6. It is understood by those skilled in the art that the engine coolant may be substituted with hot engine exhaust gases if desired. It is apparent from the above description that the first and second coolant paths within the heat exchange housing 12 are capable of being independently regulated, and facilitate a dual cross-counterflow arrangement for optimal heat exchange with respect to the fuel/air mixture traveling through the vaporizing unit 11 as described below.

Referring again to FIG. 3a, hydrocarbon fuel from a fuel source 13 is supplied to a high pressure fuel pump 3. The high pressure fuel pump 3 pressurizes the fuel to a desired pressure depending upon various factors including the number of chambers of the internal combustion engine 9 and delivers the high pressure fuel to the inlet end 103 of the upper blind bore 101 of the fuel bar assembly 100 shown in FIGS. 18–19. For example, the minimum required fuel pressure for a four cylinder engine is 100 psi, for a six cylinder engine it is 125 psi, for an eight cylinder engine it is 150 psi, for a ten cylinder engine it is 200 psi, and for a small aircraft engine it is between 200 to 300 psi. The pump pressure set point is optimally chosen so that the vaporizing unit 11 will only supply enough vaporized fuel/air mixture to the engine 9 sufficient for, for example, fifteen seconds use under full engine load.

Upon entering the fuel bar assembly 100, the fuel travels through the upper ports 104a–104c, through-bores 107a–107c of the rod 106 and through the lower ports 105a–105c and is discharged through the nozzles 110a–110c. In one example of the present embodiment, the pressure of the fuel exiting the fuel bar assembly 100 is chosen to be approximately $\frac{1}{3}$ the discharge pressure of the pump 3.

It will be appreciated by those skilled in the art that the rod 106 of the fuel bar assembly 100 acts as a rotatable throttle to control the amount of fuel flowing through the fuel bar assembly 100. The rotation of the rod 106 is controlled by the progressive linkage 114. The progressive linkage 114 also controls the position of the air damper assemblies 52, 74, 84, and 94 to regulate the amount of air drawn through the heat exchange housing 10 as described below. However, it is understood by those skilled in the art that other control mechanisms are suitable for controlling the fuel bar assembly and the damper assemblies. For example, the fuel bar assembly and damper assemblies could be controlled by an electronically controlled servo motor (not shown).

Air is drawn through the air filter 53 and heated by the heating coil 54 and the heated air flows through the damper assembly 52 of the left side outer plate assembly 50. The flow of air then enters the left side of the upper passageway 120. The incoming air mixes with the pressurized fuel exiting the fuel bar assembly 100 and travels along the length of the upper passageway 120. The fuel/air mixture then passes through the damper assembly 94 and enters the medial passageway 121. The fuel/air mixture travels along the length of the medial passageway 121, passing through the damper assembly 84, and enters the lower passageway 122. Next, the fuel/air mixture travels along the length of the lower passageway 122 and exits the heat exchange housing 12 through the damper assembly 74. The fuel/air mixture is sufficiently heated by heat transfer occurring between the high temperature engine coolant flowing through the first and second paths and the fuel/air mixture flowing through the passageways 120, 121 and 122. Preferably the fuel/air mixture will be almost completely (i.e., approximately 98% or more) vaporized and ready to be fed via the lower part of the carburetor 10a to the cylinders of the internal combustion engine 9.

Acceleration of the engine 9 is achieved by manipulation of the progressive linkage 114 (FIG. 1) which rotates the rod 106 of the fuel bar assembly 100 allowing an increased flow of fuel into the ports 105a–105c and out through nozzles 110a–110c, while simultaneously rotating the air damper assemblies 52, 74, and 94 which allow increased air and fuel/air mixture to pass through the vaporizing unit 11.

It will be appreciated that the damper assemblies not only provide for rapid acceleration and deceleration of the fuel/air mixture, but also function as independent flow rate regulators to maintain a constant ideal vaporization environment within the heat exchange housing 12. Furthermore, although the damper assemblies in the present embodiment are controlled mechanically by a progressive linkage 114, it is understood by those skilled in the art that the damper assemblies may be controlled instead with electronic servo motors.

Start-up of the engine 9 is accomplished by turning an ignition switch 4a to the ON position. A relay 4b is energized and activates a low pressure fuel pump 2. The fuel pump 2 pumps fuel to the lower part of the carburetor 10a since the engine must start on liquid fuel and the vaporizing unit 11 will not function effectively until it has reached a proper operating temperature. Accordingly, the relay 4b simultaneously activates the air heating coil 54 and the coolant heating coil 5 to rapidly achieve a minimum operating temperature (i.e., approximately 150° F.) of the vaporizing unit 11. As the engine 9 achieves its normal operating temperature and thusly raises the temperature of the engine coolant to approximately 190° F., dependence on the air heating coil 54 and the coolant heating coil 5 is reduced. When the minimum operating temperature of the vaporizing unit 11 is sensed by a temperature sensing array 4d, the relay 4b deactivates the low pressure fuel pump 2 and activates the high pressure fuel pump 3 which begins pumping fuel to the fuel bar assembly 100. The vaporizing unit 11 maintains its optimal operating temperature of approximately 190° F. via the temperature sensing array 4d which controls the temperature of the air heating coil 54 and the coolant heating coil 5.

Stopping of the engine 9 is accomplished by turning the ignition switch 4a to the OFF position, which activates a timer 4c, deactivates the high pressure fuel pump 3, and activates the low pressure fuel pump 2. The timer 4c keeps the engine 9 running for a sufficient time, approximately 15 seconds, to allow all of the vaporized fuel in the vaporizing unit 11 to be consumed by the engine 9 and for the bottom part of the carburetor 10a to fill with liquid fuel. This delayed shut-off process serves to eliminate accidental detonation of the vaporized fuel in the vaporizing unit 11 after engine shut-off and prepares the engine 9 for a subsequent start-up.

From the foregoing description, it can be seen that the present invention comprises an improved fluid vaporization system. It will be appreciated by those skilled in the art that obvious changes could be made to the embodiment described in the foregoing description without departing from the broad inventive concept thereof. For example, although the foregoing embodiment of the fluid vaporization system has been described with a specific application to an internal combustion engine, it will be appreciated that the fluid vaporization system is also well adapted for other applications, such as, for example, heating oil fuel processors, air conditioning systems, refrigeration systems and ice storage tanks. It is understood, therefore, that this invention is not limited to the particular embodiment disclosed, but is intended to cover all modifications thereof which are within the scope and spirit of the invention as defined by the appended claims.

What is claimed is:

1. A fluid vaporization system comprising:
a first inlet for receiving a first fluid; a second inlet for receiving a second fluid; a first discharge for discharging the first fluid and the second fluid; a plurality of first interconnected passages connecting the first inlet and the second inlet in fluid communication with the first discharge for mixing the first fluid and the second fluid to form a fluid mixture and delivering the fluid mixture to the first discharge; a third inlet for receiving a third fluid; a second discharge for discharging the third fluid; a second connecting passage in heat transfer relationship with the first connecting passages and connecting the third inlet in fluid communication with the second discharge for delivering the third fluid from the third inlet to the second discharge to effect transfer of heat energy between the third fluid and the fluid mixture to vaporize the fluid mixture and discharge the mixture by the first discharge in a vaporized state; and a controller disposed between at least two of the first connecting passages for controlling the amount of fluid mixture delivered from one connecting passage to another and to the first discharge.

2. A fluid vaporization system as claimed in claim 1, wherein each of the controllers comprises a rotatable rod having radially extending vanes, the rotating rod being rotatable between a first position, in which the radially extending vanes permit the fluid mixture to flow through the connecting passages, and a second position, in which the radially extending vanes block the flow of the fluid mixture through the connecting passages.

3. A fluid vaporization system comprising:
an upper plate;
a lower plate;
a plurality of side plates interconnecting the upper plate and the lower plate in spaced relation to define a sealed chamber;
first inlet means disposed in the upper plate for receiving a first fluid;
second inlet means disposed in a first one of the side plates for receiving a second fluid;
first discharge means disposed in the lower plate for discharging the first fluid and the second fluid;
third inlet means disposed in a second one of the side plates for receiving a third fluid;
second discharge means disposed in the second side plate for discharging the third fluid;
at least one intermediate plate disposed within the sealed chamber and connected to the side plates to define first connecting passage means connecting the first inlet means and the second inlet means in fluid communication with the first discharge means for mixing the first fluid and the second fluid to define a fluid mixture and delivering the fluid mixture to the first discharge means; and
aperture means disposed in the upper plate, the lower plate, the side plates and the intermediate plate and defining second connecting passage means in heat transfer relationship with the first connecting passage means connecting the third inlet means in fluid communication with the second discharge means for delivering the third fluid from the third inlet means to the second discharge means to effect heat transfer from the third fluid to the fluid mixture to effect vaporization of the fluid mixture and discharge thereof by the first discharge means in a vaporized state.

4. A fluid vaporization system as claimed in claim 3; wherein each of the first connecting passage means and the second connecting passage means defines a fluid flow passage which is serpentine in shape.

5. A fluid vaporization system as claimed in claim 3; further comprising fourth inlet means for receiving the third fluid and third discharge means for discharging the third fluid; the aperture means defining third connecting passage means in heat transfer relationship with the first connecting passage means for connecting the third inlet means in fluid communication with the second discharge means and delivering the third fluid from the fourth inlet means to the second discharge means.

6. A fluid vaporization system as claimed in claim 5; wherein the third connecting passage means defines a fluid passage which is serpentine in shape.

7. A fluid vaporization system as claimed in claim 3; further comprising first controlling means for controlling the amount of the first fluid which enters the first connecting passage means; second controlling means for controlling the amount of the second fluid which enters the first connecting passage means; and third controlling means for controlling the amount of the third fluid which enters the second connecting passage means.

8. A fluid vaporization system comprising:

first connecting passages which receive a first fluid and a second fluid for mixing the first fluid and the second fluid to form a fluid mixture and discharges the fluid mixture;

second connecting passages which receive and discharges a third fluid, the second passages being in heat transfer relationship with the first passages and defining a serpentine cross-counterflow heat exchanger to effect transfer of heat energy from the third fluid to the fluid mixture to vaporize the fluid mixture and discharge the fluid mixture in a vaporized state;

a first controller for controlling the amount of the first fluid which enters the first passages, the first controller comprising a first bore for receiving the first fluid, a second bore in fluid communication with the first bore and the first passages, and a rotatable rod having a radial bore and being rotatably disposed within the second bore, the rotatable rod being rotatable between a first position, in which the radial bore is in fluid communication with the first bore such that the first fluid is permitted to flow into the first passages and a second position in which the radial passage is not in fluid communication with the first bore such that the first fluid is prevented from flowing into the first passages;

a second controller for controlling the amount of the second fluid which enters the first passages;

a third controller for controlling the amount of the third fluid which enters the second passages.

9. A fluid vaporization system as claimed in claim 8, wherein the third controller comprises a fluid control valve.

10. A fluid vaporization system as claimed in claim 8, further comprising a fourth controller disposed in the first passages for controlling the amount of fluid mixture discharged therefrom.

11. A fluid vaporization system as claimed in claim 10, wherein the fourth controller comprises a rotatable rod having radially extending vanes, the rotatable rod being rotatable between a first position, in which the radially extending vanes permit the fluid mixture to flow through the first passages, and a second position in which the radially extending vanes block the flow of the fluid mixture through the first passages.

12. A fluid vaporization system comprising:

first connecting passages which receive a first fluid and a second fluid for mixing the first fluid and the second fluid to form a fluid mixture and discharges the fluid mixture;

second connecting passages which receive and discharges a third fluid, the second passages being in heat transfer relationship with the first passages and defining a serpentine cross-counterflow heat exchanger to effect transfer of heat energy from the third fluid to the fluid mixture to vaporize the fluid mixture and discharge the fluid mixture in a vaporized state;

a first controller for controlling the amount of the first fluid which enters the first passages;

a second controller for controlling the amount of the second fluid which enters the first passages, the second controller comprising a rotatable rod having radially extending vanes, the rotatable rod being rotatable between a first position, in which the radially extending vanes permit the second fluid to flow into the first passages, and a second position, in which the radially extending vanes block the flow of the second fluid into the first passages;

a third controller for controlling the amount of the third fluid which enters the second passages.

13. A fluid vaporization system as claimed in claim 12, wherein the third controller comprises a fluid control valve.

14. A fluid vaporization system as claimed in claim 12, further comprising a fourth controller disposed in the first passages for controlling the amount of fluid mixture discharged therefrom.

15. A fluid vaporization system as claimed in claim 14, wherein the fourth controller comprises a rotatable rod having radially extending vanes, the rotatable rod being rotatable between a first position, in which the radially extending vanes permit the fluid mixture to flow through the first passages, and a second position in which the radially extending vanes block the flow of the fluid mixture through the first passages.

* * * * *